Nov. 15, 1960     J. H. SMITH     2,960,082
ENGINE STARTING AND PROTECTIVE SHUTDOWN SYSTEM
Filed Dec. 31, 1958     7 Sheets-Sheet 1

INVENTOR.
John H. Smith
BY
ATTORNEY

Nov. 15, 1960  J. H. SMITH  2,960,082
ENGINE STARTING AND PROTECTIVE SHUTDOWN SYSTEM
Filed Dec. 31, 1958  7 Sheets-Sheet 4

INVENTOR.
John H. Smith
BY
ATTORNEY

Nov. 15, 1960 J. H. SMITH 2,960,082
ENGINE STARTING AND PROTECTIVE SHUTDOWN SYSTEM
Filed Dec. 31, 1958 7 Sheets-Sheet 5

INVENTOR.
John H. Smith
BY
L.D. Burch
ATTORNEY

Nov. 15, 1960         J. H. SMITH         2,960,082
ENGINE STARTING AND PROTECTIVE SHUTDOWN SYSTEM
Filed Dec. 31, 1958         7 Sheets-Sheet 6
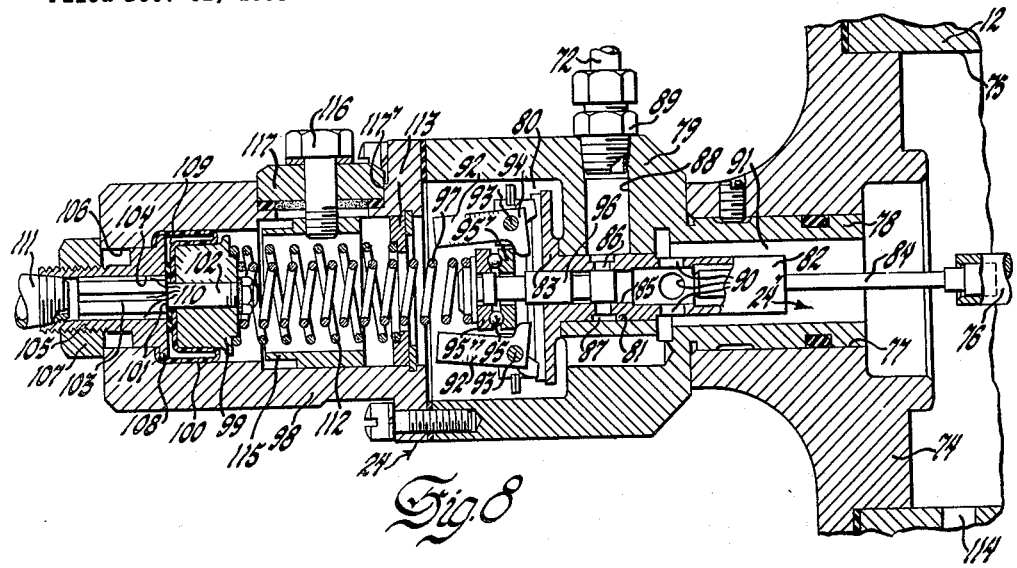
INVENTOR.
John H. Smith
BY
ATTORNEY Nov. 15, 1960 J. H. SMITH 2,960,082
ENGINE STARTING AND PROTECTIVE SHUTDOWN SYSTEM
Filed Dec. 31, 1958 7 Sheets-Sheet 7
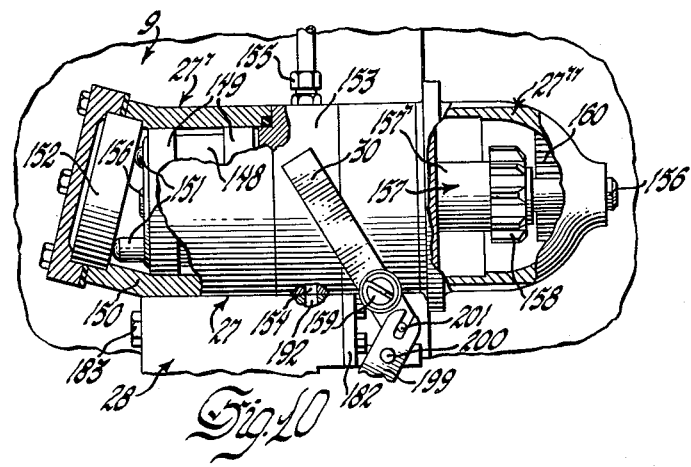
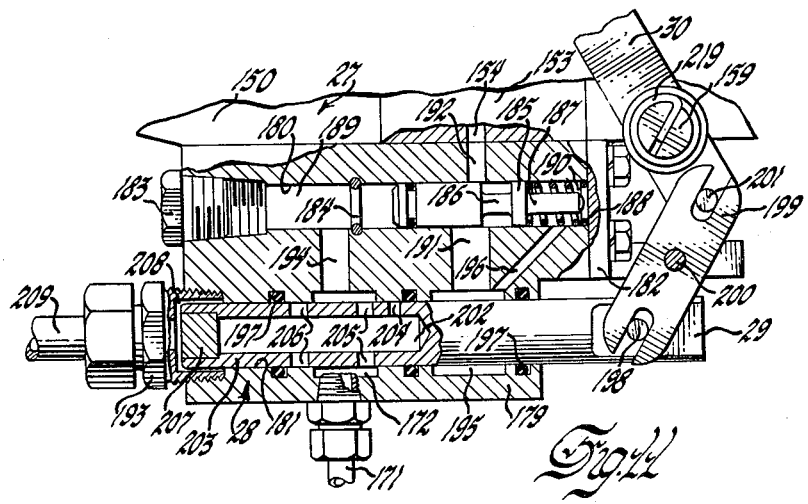
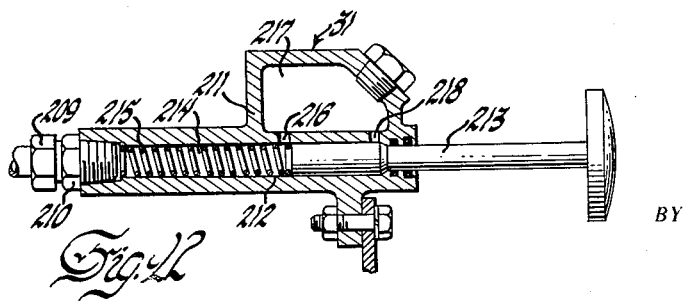
INVENTOR.
John H. Smith
BY
L.D. Burell
ATTORNEY United States Patent Office 2,960,082
Patented Nov. 15, 1960

2,960,082

ENGINE STARTING AND PROTECTIVE SHUTDOWN SYSTEM

John H. Smith, Farmington, Mich., assignor to General Motors Corporation, Detroit, Mich., a corporation of Delaware Filed Dec. 31, 1958, Ser. No. 784,192

7 Claims. (Cl. 123—179)

This invention relates to internal combustion engines generally, and more particularly to a combined engine starting and protective shutdown system.

In internal combustion engine installations where engine operation is under only nominal or without operator supervision, it is common practice to provide a protective system operable to shut down the engine in response to an excessive variation in an engine or engine associated accessory operating condition above or below a predetermined safe operating value. The shutting down of the engine is generally effected by the release of a latch mechanism normally maintaining a fuel or combustion air cut-off valve in an open position against the biasing action of a spring operable to close such a valve. Such protective systems are generally responsive to one or more of engine oil, fuel and air box pressure; cooling water, cylinder wall, bearing, and exhaust gas temperatures; and to excessive load and speed conditions.

In starting an engine having such a protective shutdown system, it is generally necessary to override the shutdown mechanism until the desired safe operating levels of several engine and accessory operating conditions can be achieved. This overriding of the protective system is generally accomplished manually. However, where the engine starting is effected by a remote control or is accomplished automatically, as in an automatic engine generator set or refrigerator car installation, the necessary shutdown overriding controls have generally been rather complex and extremely susceptible to malfunction.

The invention contemplates providing an internal combustion engine with a combined engine starting and protective system including an improved shutdown overriding control mechanism which is relatively simple, inexpensive, easy to service and maintain, extremely reliable in operation, and therefore applicable for remote and automatic engine starting installations.

The several contemplated objectives of the invention are obtained in a preferred illustrative embodiment by providing such an engine with a shutdown mechanism operable to shut down the engine by a suitable means such as by shutting off the engine intake air in response to a failure of an engine operating condition such as oil pressure. The engine protective system may also include other means operable in response to other engine operating conditions such as overspeed and excessive exhaust and water temperatures and the like to simulate such failure of the shutdown controlling condition. The engine starting mechanism includes a hydraulic engine starting device which is remotely controlled by a fluid pressure signal applied thereto and is operable by high pressure hydraulic fluid supplied thereto from a pressure storing accumulator device to rotatably drive the engine at a relatively high starting speed. The starter controlling fluid pressure signal is also applied to a shutdown overriding control mechanism which is operable in response thereto to prevent operation of the engine shutdown mechanism during the starting period and until the engine operating condition, i.e. oil pressure, which is applied thereto in opposition to the starting pressure signal, has reached the minimum desired value.

The foregoing and other objects, advantages and features of the invention will be more thoroughly understood from the following description of an illustrative embodiment thereof having reference to the several accompanying drawings in which:

Figure 8 is a longitudinal section through an overspeed trip governor operable to simulate an engine shutdown oil pressure failure;

Figure 9 is a sectional view taken substantially in the plane of the line 9—9 of Figure 1 showing an exhaust and water temperature responsive device operable to simulate an engine shutdown oil pressure failure;

Figure 10 is a view partly in elevation and partially broken away to show certain details of a preferred form of hydraulic engine starting device;

Figure 11 is a view partly in elevation having portions thereof broken away and in section to show the details of a preferred form of starter energizing valve; and Figure 12 is a longitudinal sectional view of a remote control operable to actuate the starter control valve and shutdown overriding mechanism in accordance with the invention during the engine starting period.

While the invention is shown and described as applied to internal combustion engines, such is to be taken only for purposes of illustration since the invention is considered equally applicable to engines of various other types.

Figure 1:
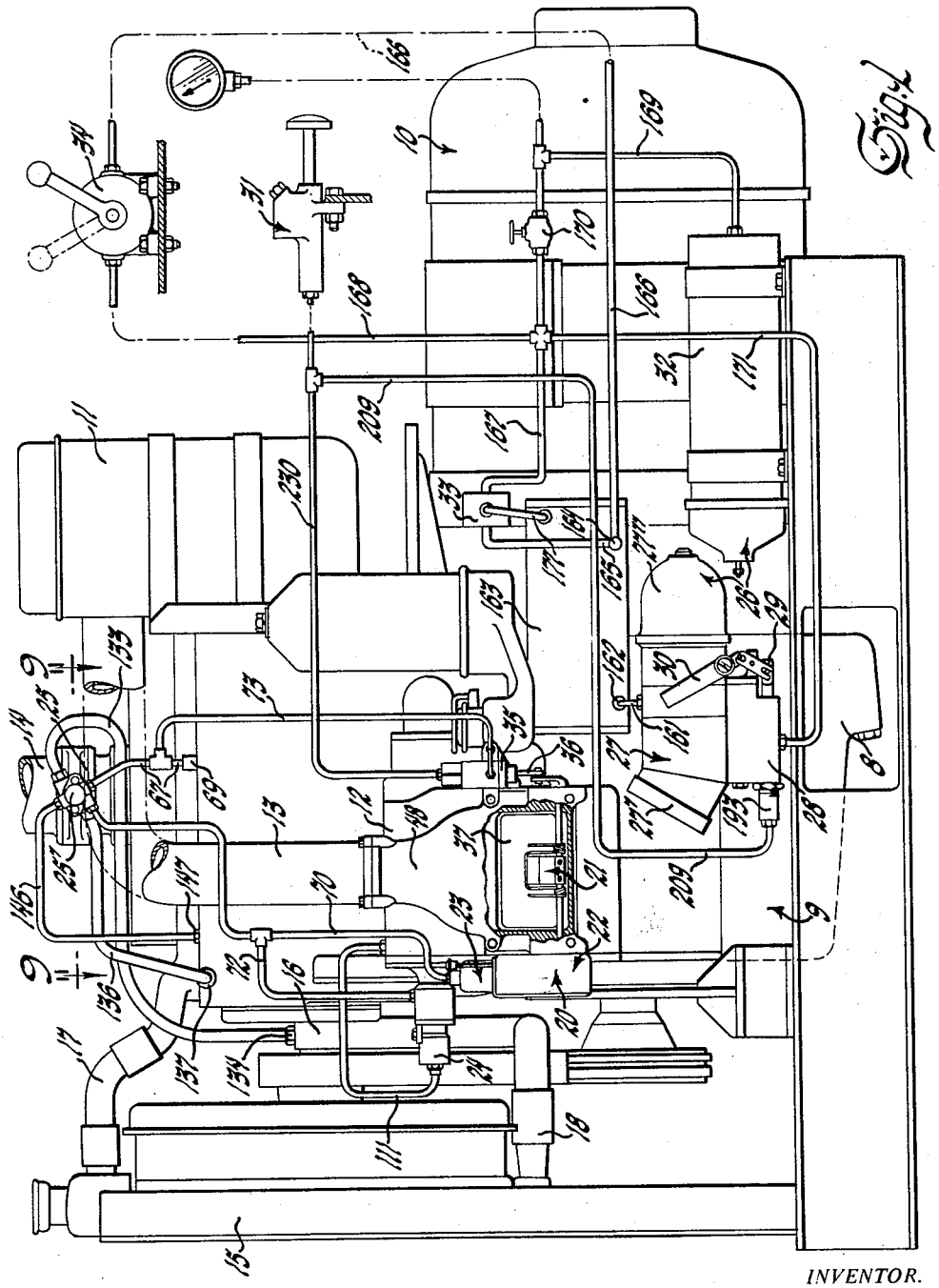
Figure 1 is a view in side elevation of an internal combustion engine incorporating an engine starting and protective shutdown system embodying the invention and having portions thereof broken away and in section.
Figure 2:
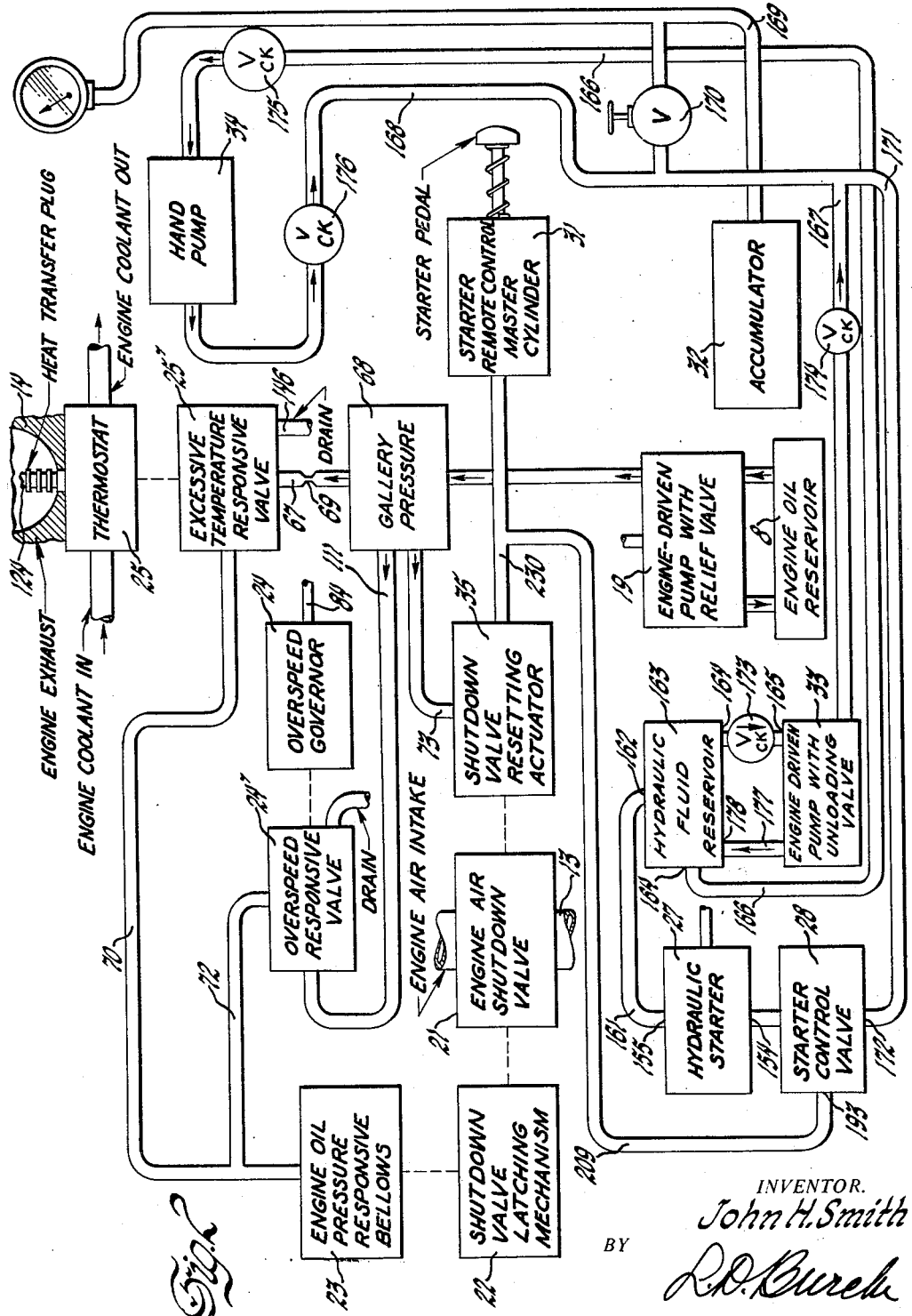
Figure 2 is a diagrammatic view showing the engine starting and protective shutdown system of the invention as shown in Figure 1.

Referring now in detail to the drawings and more particularly to Figures 1 and 2, the numeral 9 indicates an internal combustion engine which is drivingly connected to a suitable load device such as an output generator as shown at 10. Air for supporting engine combustion is taken in through an air filter 11 which is connected to an engine charging blower 12 by a duct 13. The engine exhaust gas outlet duct is shown at 14. Engine cooling water is circulated through the engine and a radiator 15 by a suitable pump 16, the water outlet of the engine being connected to the radiator by a pipe 17 and the radiator outlet being connected to the pump inlet by a return pipe 18. The blower, water pump, and an oil pressure pump, indicated at 19 in Figure 2, are each driven by the engine in the illustrative embodiment but it will be appreciated that any of these engine accessories may be separately operated units within the scope of the invention.

The oil pressure pump 19 is operable to pump oil from the oil pan defined engine oil sump or reservoir 8 and to supply pressurized oil to the several oil galleries of the engine for distribution for engine lubricating and cooling purposes. A pressure regulating relief valve associated with the oil pump is operable to limit the maximum oil gallery pressure.

The numeral 20 generally indicates the engine shutdown effecting protective system which is similar to that shown and described in United States patent application Serial No. 608,470, filed September 7, 1956, now Patent #2,894,502 in the names of Michael H. O'Brien and Roger D. Wellington. The engine protective system 20 includes a valve 21 which is operative to control the flow of combustion supporting air through the air inlet duct 13. The valve 21 is normally maintained in an opened position by a latching mechanism 22. The latch mechanism 22 is controlled by an oil pressure responsive unit 23 which is operable to trip the latch mechanism 22 to permit the air shutoff valve 21 to move to its closed position whenever the engine oil pressure applied thereto is below a predetermined minimum value. An overspeed governor 24 responsive to engine speed is operable through a pressure relieving valve mechanism 24' to simulate an engine shutdown effecting oil pressure failure whenever the engine oil pressure is below a safe operating level for the corresponding engine speed or the engine speed is in excess of a maximum safe operating speed. An exhaust gas and cooling water responsive unit 25 is also operable through a second pressure relieving valve mechanism 25' to simulate such an engine shutdown effecting oil pressure failure whenever the exhaust gas or water temperatures are excessive or a failure of cooling water circulation through the engine occurs.

The numeral 26 generally indicates the hydraulic engine starting system which is similar to that shown and described in United States patent application Serial No. 625,063, filed November 29, 1956, now Patent #2,894,501 in the name of Morris J. Duer. The hydraulic engine starting system comprises a hydraulic starting device 27 which includes a hydraulic motor 27' and a drive establishing means 27'' adapted to drivingly connect and disconnect the motor from the engine 9. Operation of the hydraulic starting device 27 is controlled by a valve mechanism 28 including a valve member 29 which is shiftable, either by local manual actuation of a control lever 30 or by a hydraulic actuating signal supplied thereto by a remote control unit 31, to control the supply of high pressure fluid from a pressure storing accumulator 32. The accumulator is changeable with pressure fluid from a suitable hydraulic fluid source by an engine driven pump 33 or an emergency hand pump 34.

In accordance with the invention, a two-way pressure operated actuator or relay 35 is provided which is operable to override the engine shutdown functioning of the engine protective system 20 during the engine starting period. The presssure-operated relay 35 includes an actuator member 36 which is shiftable to actuate the engine shutdown effecting air valve 21 to its opened position in response to the remote control, starter energizing signal simultaneously applied thereto. As explained in greater detail below, the actuator mechanism is adapted to retain the valve 21 in its open position until engine oil pressure has reached the minimum value required by the pressure responsive unit 23 to permit the latch mechanism 22 to catch and retain the valve in its opened position. Application of this minimum oil pressure to the actuator device is operable thereon to overcome the effect of the remote starter actuating signal and returns the actuator member to its initial position wherein the valve 21 is free to move to its closed position except for its retention by the latch mechanism 22.

Engine protective system

Figure 3:
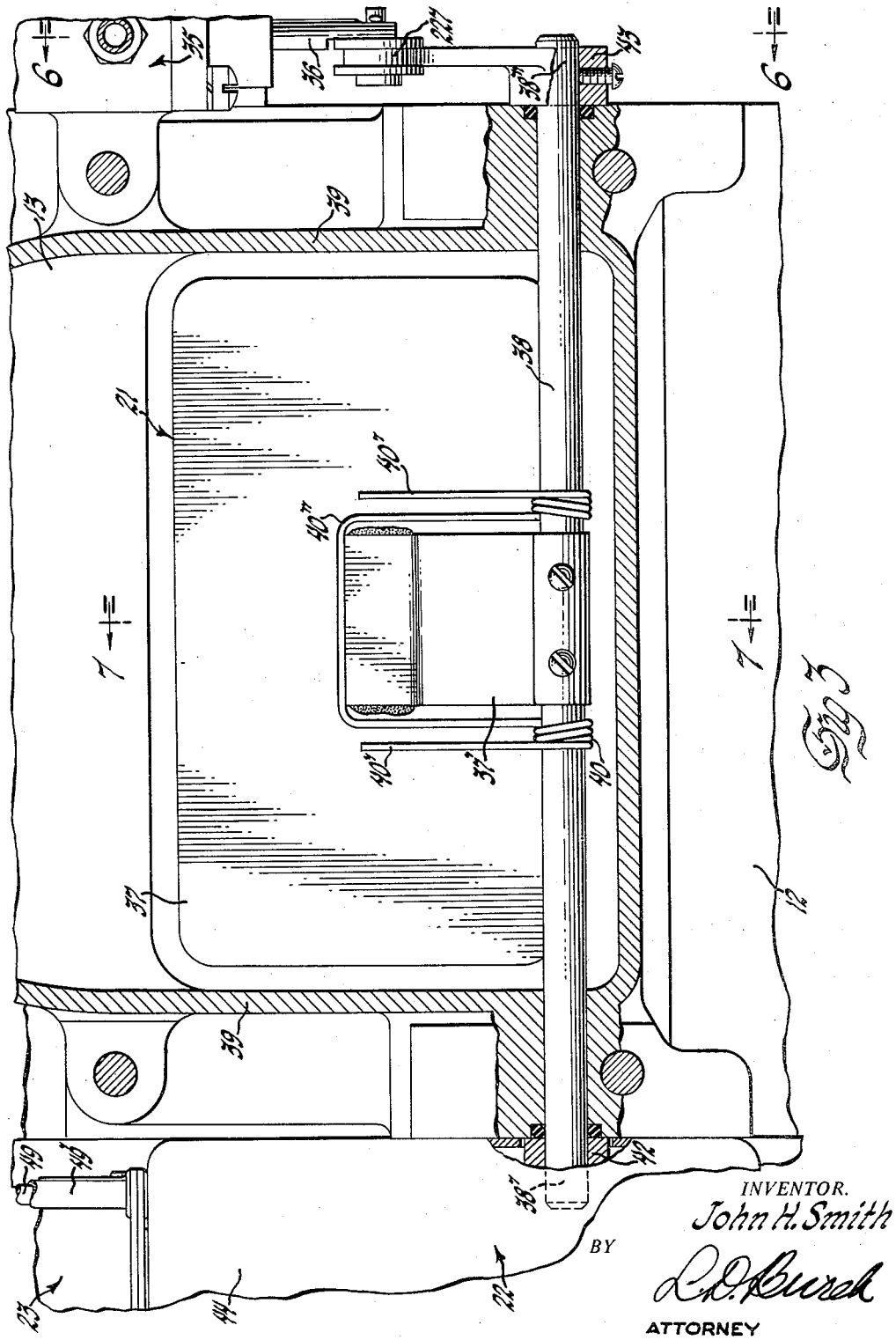
Figure 3 is an enlarged view partly in section and partly in elevation and showing a portion of Figure 1 in greater detail.
Figures 6, 7:
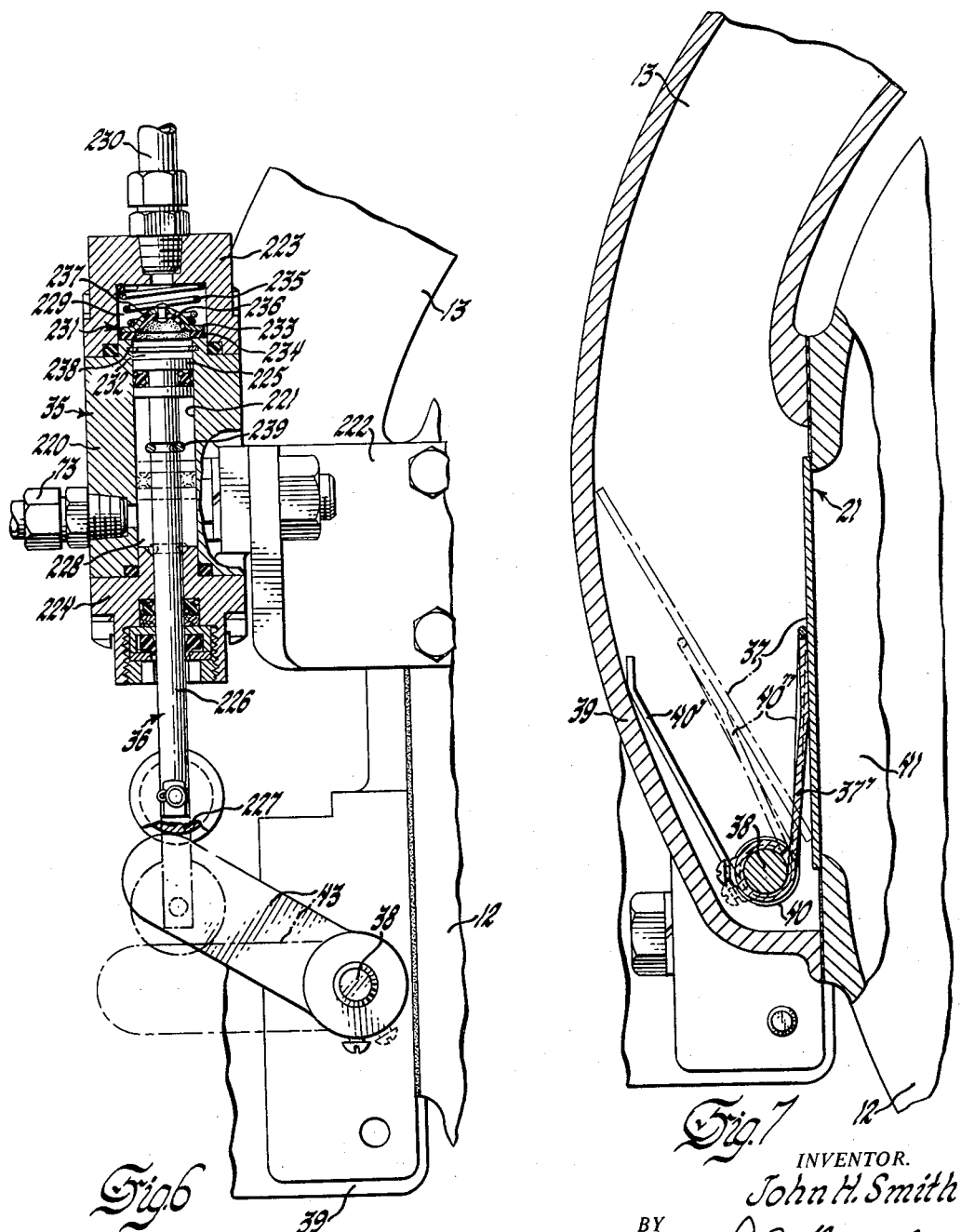
Figure 6 is a view partly in section and partly in elevation showing a shutdown overriding device constructed in accordance with the invention and taken substantially on the line 6—6 of Figure 3.
Figure 7 is a sectional view taken substantially on the line 7—7 of Figure 3.

As shown in Figures 1, 3 and 7, the shutoff valve mechanism 21 includes a flap valve member 37 which is suitably secured to a shaft 38 by a mounting arm 37'. The shaft 38 is pivotally mounted transversely of a blower inlet housing 39 which defines the blower adjacent end of the intake duct 13. Yieldable biasing means in the form of a torsion spring 40 has an intermediate leaf spring center portion wrapped around the shaft 38 and has its opposite leaf spring ends 40' and 40'' engaging the inlet housing 39 and the valve member 37, respectively. The torsion spring 40 thus serves to bias the valve member 37 from its opened position shown in broken lines in Figure 7 toward its closed position, as shown in full lines in the several figures of the drawings, wherein it closes the blower inlet 41 to shut off the supply of combustion supporting air to the blower and engine.

Figure 4:
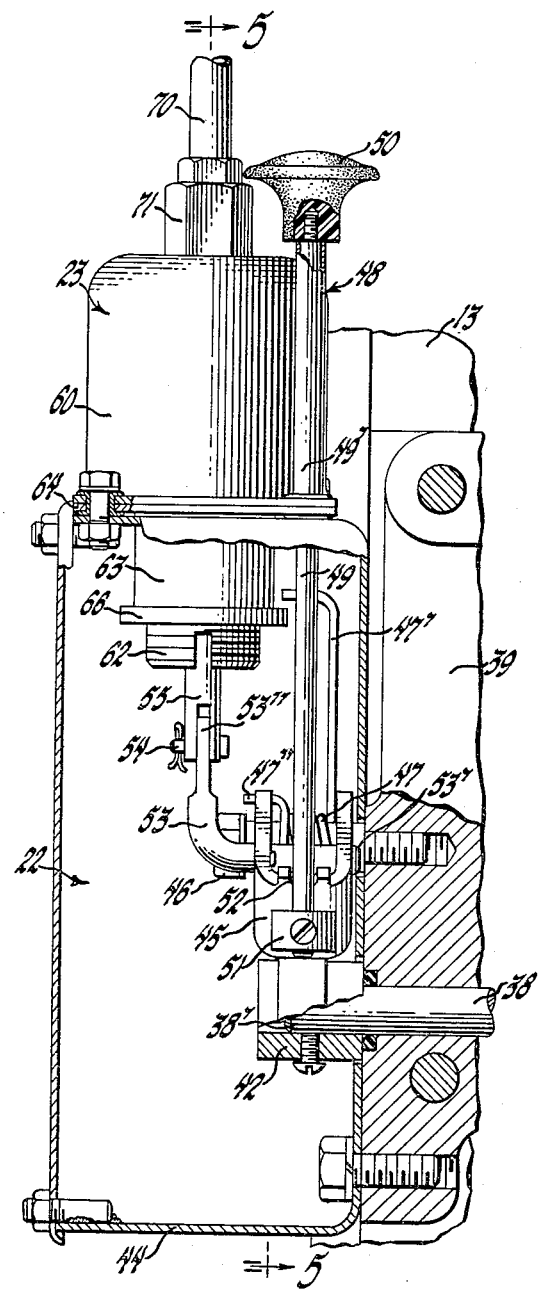
Figure 4 is an enlarged view of a second portion of the engine shutdown mechanism shown in Figure 1 with portions thereof broken away and shown in section.
Figure 5:
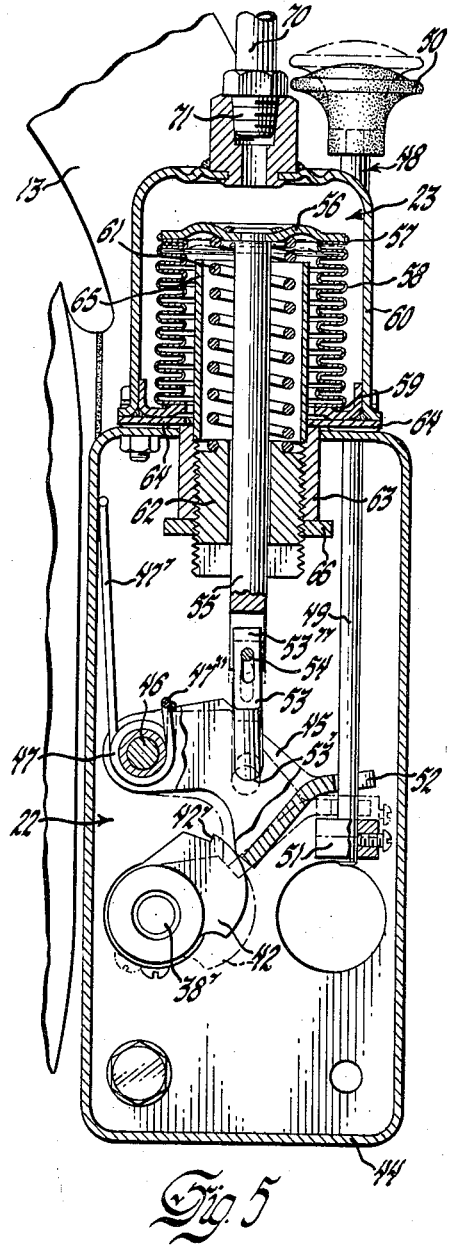
Figure 5 is a sectional view of that portion of the shutdown mechanism shown in Figure 4 and is taken substantially on the line 5—5 thereof.

The opposite ends 38' and 38'' of the valve mounting shaft 38 project outwardly of their pivotal mountings in the inlet housing member 39 and have valve controlling members secured thereto in the form of a latch detent lever 42 and a shutdown overriding lever 43, respectively. The latch mechanism 22 includes the latch detent lever 42 and is enclosed within a housing or box 44. The housing 44 is suitably secured to the adjacent side face of the blower inlet housing 39. A latch lever 45 is pivotally mounted within the housing 44 by a pivot bolt 46 which is threadably mounted by the inlet housing. As best seen in Figures 4 and 5, the latch lever 45 is of U-shaped configuration and is yieldably biased in a clockwise direction, as viewed in Figure 5, by a second torsion spring 47. The spring 47 embraces the pivot pin 46 with the opposite ends thereof 47' and 47'' resiliently engaging the side wall of the housing 44 and one leg of the latch lever 45, respectively. The clockwise biasing action of the spring 47 tends to carry the bight portion of the lever 45 into valve-opened, locking engagement with a detent shoulder 42' formed on the latch detent lever 42.

Rotation of the latch lever 45 from its position shown in broken lines in Figure 5 to its position shown in full lines carries its bight portion out of engagement with the detent latch shoulder 42' and permits the valve member 37 to be actuated to its shutdown effecting closed position by the combined biasing action of the spring 40 and the blower intake suction. Such rotation of the latch lever 45 is accomplished against the biasing action of spring 47 by either a manual shutdown control 48 or by the oil pressure responsive unit 23. The manual shutdown control 48 comprises a push-pull rod 49 which is reciprocably mounted in a sleeve 49' carried by the upper wall of the housing 44. The upper end of the rod is provided with a knob 50 adapted to be grasped for operation by the operator. The lower end of the rod 49 carries a shoulder defining member 51 which, upon upward movement of the rod 49, is adapted to engage a bifurcated extension 52 of the latch lever bight portion thereby carrying the latch lever 45 out of its detent engaging relation with the latch detent lever 42.

The latch lever 45 has a one-way driving connection with the pressure responsive unit 23 through a bent link 53 having one leg thereof 53' pivotally extending through the two legs of the latch lever 45 intermediate their ends. The other upwardly extending leg 53'' of the link 53 has a pin-and-slot, lost-motion driving connection 54 with the lower end of an actuator rod 55. The upper end of the rod 55 is suitably secured to a flange member 56 which is sealed outwardly at 57 to the upper movable end of a bellows element 58. The lower end of the bellows element is sealed at 59 to the open end of a cup-shaped container or housing 60 which is suitably mounted on the upper wall of the housing box 44. Yieldable biasing means in the form of a coil spring 61 is compressively interposed between the upper flange member 56 of the bellows assembly and a spring seating plug 62. The plug 62 is adjustably threaded in a cylindrical member 63 suitably secured to and carried by an annular washer or flange 64 clamped between the cup-shaped housing member 60 and the box 44. The spring 61 is spacedly embraced by a spring guide sleeve 65 which is carried by the upper end of the cylindrical member 63 and forms an abutment stop for the bellows flange 56. The spring 61 tends to expand the bellows element 58 to move the rod 55 upwardly into latch disengaging driving relationship with the link 53 through the pin and slot connection 54. The spring seat retainer plug 62 is normally locked in its adjusted position by a washer type lock nut 66.

The interior of the cup-shaped container 60 surrounding the bellows element is normally subjected to engine lubricating pressure, being supplied with engine oil through a passageway connected to the pressure side of the engine lubricating system. This passageway includes a conduit or pipe 67 which interconnects the main oil gallery of the engine, indicated at 68 in Figure 2, through a flow restricting orifice 69 and the temperature responsive valve mechanism 25', to one end of a pipe or conduit 70. The pipe 70 is connected at its opposite end to the upper end of the cup-shaped container member 60 by a suitable connection as shown at 71. A branch conduit 72 off the pipe 70 intermediate its ends is connected at its distal end to the overspeed responsive pressure release valve mechanism 24'. A second branch conduit 73 intersects the pipe 67 intermediate the orifice 69 and the temperature responsive valve mechanism 25' and is connected at its distal end to the engine shutdown overriding actuator unit 35.

During normal operation of the engine lubricating system the oil supplied to the interior of the cup-shaped container 60 is at sufficient pressure to axially contract the bellows 58 in opposition to the spring 61. This axial pressure responsive contraction of the bellows is limited by the spring guide stop member 62 and carries the rod 55 downwardly within the lost motion no-drive range permitted by the pin-and-slot connection 54. Since bellows contraction thus permits the latch lever 45 to be biased into its detent engaging relation with the lever 42. However, upon a failure of the engine oil pump or pressure system to maintain the minimum predetermined "trip pressure" in the conduit 67, the bellows 58 is expanded under the biasing force of the spring 61 actuating the rod 55 and the link 53 to carry the latch lever 45 to its detent release position, as shown in full lines in Figure 5, permitting the valve member 37 to move to its air shutoff, closed position.

As shown in Figure 8, the overspeed governor 24 and pressure relieving valve mechanim 24' includes a housing assembly which is mounted on the blower 12. The governor housing comprises a support member 74 which is telescopically mounted in an opening 75 formed in the blower housing in axial alignment within an impeller shaft 76. The mounting member 74 is provided with a central bore 77 which telescopically mounts a cylindrical extension 78 of an intermediate housing member 79. The end of the housing member 79 opposite the extension 78 is recessed to define a flyweight chamber 80. The body portion of the housing member 79 intermediate the cylindrical extension and chamber 80 is provided with a bore 81 which is substantially coaxial with the blower impeller shaft 76 and journals a hollow shaft portion 82 of a centrifugal flyweight carrier 83. The weight carrier 83 is drivingly connected to the impeller shaft 76 through a suitable flexible shaft connection shown at 84.

The hollow shaft portion 82 of the carrier 83 forms a rotatable valve body having a central bore 85 which extends therethrough and is connected by one or more radial ports 86 to an annular groove 87 which is formed externally thereof. The groove 87 opens on a passage 88 extending radially of the housing member 79. The passage 88 is connected to the engine oil pressure supply conduit 72 by a suitable pressure fitting indicated at 89. The bore 85 is also in communication with the interior of the blower housing through one or more radial ports 90 longitudinally spaced from the port 86 and an annular passage 91 formed between the tubular extension of the housing 77 and the blower end of the carrier 83.

One or more bell crank type centrifugal flyweights 92 are pivotally mounted at 93 on the weight carrier 83 and have arms 94 thereon which are arranged to engage one race 95' of an antifriction thrust bearing 95 upon speed responsive outward movement of the weights 92. The other race 95" of the bearing 95 is suitably mounted on and secured to a valve member 96 which is reciprocably mounted in the valve bore 85 and normally provides a closure for the ports 86. Biasing means in the form of a compression spring 97 is seated at one end against the bearing race 95" and valve member 96 and tends to maintain the valve in its closed position with respect to the port 86 in opposition to the thrust imposed thereon by the speed responsive outward swinging of the flyweights 92 during engine operation. It should be noted that the thrust imposed by the bell crank flyweights tends to vary as the square of the engine speed.

The end of the compression spring 97 opposite the valve member 96 is seated against a piston member 99 which is spacedly embraced by cylindrical end housing member 98 which forms an extension of the flyweight chamber 80 and closes the open end of the intermediate housing member 79. The piston member 99 is sealed with respect to the end housing member 98 by a flexible diaphragm 100 to define an expansible chamber 109 therebetween. The diaphragm 100 is sealingly clamped inwardly between the piston proper and a shoulder 101 formed by the head of a bolt 102 which is secured to and extends through the piston. The head 103 of the bolt 102 is slidably mounted within a bore 104 extending axially of a gland member 105 and thus forms a crosshead reciprocably mounting the piston member 99. The gland member 105 is mounted in a bore 106 extending through the end wall of the housing member 98 and is secured in place by a nut 107 which is threadable thereon externally of the housing member. The inner end of the gland member is provided with an annular flange 108 which sealingly clamps the outer end of the diaphragm 100 to the housing member 98. The diaphragm 100 thus serves a movable end wall for the expansible chamber 109, being of a configuration to roll on the concentrically spaced surfaces of the piston and housing member upon relative movement therebetween.

The expansible chamber 109 is connected through grooves 110 extending longitudinally of the bolt head 103 to one end of a pipe or conduit 111 connected at its distal end to suitable oil supply passages, not shown, in the housing of the blower 12 and therethrough to the main lubricating supply gallery of the engine, as indicated in Figure 2. Biasing means in the form of a second compression spring 112 is interposed between piston member 99 and an annular spring seating washer 113 carried by the end of the cylinder member 70 adjacent the flyweight chamber 80. The spring 112 tends to bias the piston in opposition to the lubricant pressure supplied to the expansible chamber 109. It will thus be seen that the position of the piston is determined by a balance between the parallel biasing forces of the springs 97 and 112 and the force of the engine gallery oil pressure acting on the expansible chamber end of the piston member 99. This results in a modulation of the biasing action of the speeder spring 97 in accordance with the engine oil pressure supplied thereto and consequently in the engine speed at which the centrifugal weights 92 are effective to shift the valve member 96 to open the ports 86.

In conventional engines of this type, the engine oil supply pressure normally increases as a substantially straight-line function of the pump driving engine speed until a maximum desired gallery pressure is reached and further maintained by a pressure regulating relief valve which is generally associated with the engine oil pump. The supplied oil pressure is also generally substantially in excess of the minimum oil pressure required to properly lubricate the engine which also increases as a substantially straight-line function of the engine speed. The relative deflection rates of the springs 97 and 112 are preferably proportioned so that spring 112 absorbs a substantially greater portion of the total force developed by the oil pressure acting on the piston than that portion of such total force absorbed by the speeder spring 97. This minimizes the parabolic deviation in the valve actuation which results with increasing engine speed due to the inherent speed responsive deflection characteristics of the bellcrank flyweights from a desired straight-line function, corresponding substantially to the minimum safe oil pressure required for proper engine lubrication, to a value within the accepted operating tolerances for such governor mechanisms. This occurs since the variation in the speeder spring bias due to the centrifugal forces acting on the weights 92 is reduced to a relatively insignificant percentage of the total forces involved.

The engine oil pressure as applied to the expansible chamber 109 normally acts on the piston 99 to maintain the speeder spring 97 under sufficient compression to prevent the weights 92 from shifting the valve member 96 a sufficient distance to uncover the pressure release ports 86 when the engine is operating within its normal speed range. However, should the oil pressure supplied to the chamber 109 fall below a minimum safe oil pressure for the particular governor driving speed, the consequent reduced biasing action of the speeder spring 97 permits sufficient outward movement of the flyweights 92 to shift the valve member 96 to uncover the ports 86 thus connecting and draining oil from the pipe 72 to the interior of the blower housing 75 from which it drains to the engine oil sump and through the drain passage indicated at 114. Under such valve open conditions, the oil pressure applied to the container 60 falls below the "trip pressure" for the bellows 40 since the flow of oil into the pipes 67 and 70 is sufficiently restricted by the orifice 69. The resultant actuation of the rod 55 by the spring 61 disengages the latch lever 45 from the detent 42' on the latch detent lever 42 thereby permitting the engine intake shutoff valve member 37 to be actuated to its closed engine shutdown position.

The overspeed governor valve mechanism 24' is similarly operative to relieve the oil pressure in the pipe 70 and container 60 when the speed of the engine is in excess of a predetermined maximum limit established by the setting of a stop or abutment sleeve 115 which is slidably adjustable within the housing member 98 and limits axial movement of the piston in a speeder spring bias increasing direction. Axial adjustment of the sleeve 115 is effected by bolt 116 which is threaded therein and journaled eccentrically of a disk 117 which is rotatably mounted in a counterbore 117' formed at one side of the housing member 98. As the engine approaches its maximum speed limit, the oil pressure supplied to the chamber 109 shifts the piston 99 into abutment with the sleeve 115. Such abutment limits the maximum compression of the speeder spring 97 and thus the maximum engine speed beyond which the flyweights 92 are effective to open the pressure release ports 86 irrespective of the fact that the engine oil lubricating system may be functioning properly.

The minimum speed at which the pressure release mechanism is effective to relieve the oil pressure in pipe 72 below the "bellows trip pressure" is established by abutment of the piston against the adjacent end of the gland 105. When in such abutment, the diaphragm 100 seals the ends of the grooves 110 preventing the application of engine oil pressure to the expansible chamber 109. However, the initial bias imposed on the compression spring 97 is sufficient to prevent the weights 92 from shifting the valve member 96 to uncover the pressure release ports 86 when the engine is operating below its normal idle speed. As engine speed is increased to or beyond engine idle, the oil pressure applied to the head end of the bolt 102 shifts the diaphragm and piston out of such sealing engagement thereby supplying the oil pressure to the expansible chamber 109 with resultant oil pressure modulation of the speeder spring biasing action and the valve opening engine speed.

The gas and cooling water temperature responsive unit 25 and the oil pressure relieving valve mechanism 25' operated thereby comprises an annular collar or connector 118 which is mounted in the exhaust duct 14 and has a bore 119 extending radially therethrough. A thermostat housing 121 having a bore 120 extending therethrough and a valve housing member 122 closing one end of the bore 120 are both suitably secured to a side face of the connector 118 with the bores 119, 120 being in axial alignment with each other and substantially coextensive. A heat exchange plug 123 is supported intermediate its ends in the radial connector bore 119 with one end 124 thereof projecting within the exhaust duct 14 and the opposite end 125 thereof projecting within the thermostat housing bore 120. The exhaust duct projecting end of the plug is provided with a plurality of annular flanges 124' increasing the heat exchange surface thereof. The opposite end of the heat exchange plug 125 cooperates with the thermostat housing 121 and valve housing 122 to define a thermostat mounting chamber 126 therebetween. The thermostat end of the plug 123 is recessed at 127 to telescopically mount one end of a thermostatic unit 128 of the pellet type. The opposite end of the unit 128 forms a tubular extension 129 which is threadably and sealingly mounted with respect to the valve housing 122. The thermostat mounting end of the plug 123 is grooved to provide a plurality of heat exchange flanges 130 and is provided with a plurality of radial ports 131 interconnecting the chamber 126 with the space defined between the thermostatic pellet 128 and the end of the recess 127. The thermostat housing 121 is provided with an inlet port 132 which opens on the thermostat mounting chamber 126 and is connected through a pipe or conduit 133 to the pressure discharge outlet of the cooling water pump as indicated at 134 in Figure 1. A water outlet port 135 in the housing member 121 connects the chamber 126 through a pipe or conduit 136 to the cooling water jacket of the engine as indicated at 137.

The thermostatic pellet unit 128 in response to temperature changes imposed thereon actuates a plunger 138 which is maintained in thrust engagement with one end of a valve stem member 139. The valve stem member 139 threadably mounts a valve member 140 which is biased by a spring 141 toward sealing engagement with a valve seat 142. When the valve member 140 is in sealing engagement with its seat 142 it separates an inlet chamber 143 formed in the valve housing 122 from a spring mounting, oil drain chamber 144 which is defined by the housing 122 and a spring seating end cap 145. The pressure inlet chamber 143 serves to interconnect the pressure supply line 67 from the flow restricting orifice 69 with the pipe 70 leading to the pressure responsive unit 23 and the overspeed oil pressure relieving mechanism 24'. The drain chamber 144 is connected to one end of a suitable pipe or conduit 146 which is connected at its distal end as indicated at 147 to suitable oil drain galleys and passages of the engine and therethrough to the engine oil reservoir or sump 8.

From the foregoing, it will be noted that heat transferred to the thermostatic pellet unit 128 by conduction through the plug 123 from its exhaust gas exposed end 124 is normally reduced by the cooling water flowing through the thermostat mounting chamber 126. As long as the exhaust gas temperatures are below a predetermined safe operating limit and the cooling water flow, which is generally proportional to engine-pump speed, and the thermostatically controlled water temperature are sufficient to adequately cool the thermostatic pellet unit 128, the pellet unit is incapable of actuating the valve member 140 to its pressure relieving open position. However, when either the exhaust gas or water temperatures are excessive or cooling water flow through the thermostat housing chamber 126 is restricted, the valve member 140 is actuated by the thermostatic pellet to its open position wherein the oil pressure supplied through the flow restricting orifice 69 to the pipe 67 is dumped to the drain chamber and pipe 146 and thereby to the engine oil reservoir or sump 8. The resultant reduction in oil pressure supplied to the pressure responsive unit 23 through the conduits 67 and 70 simulates an engine oil pressure failure which disengages the latch lever 45 from the detent 42' thus permitting the intake valve member 37 to be actuated to its engine shutdown closed position.

Engine starting system

Referring more particularly to Figure 10 of the drawings, the hydraulic motor 27' of the starter device 27 comprises a cylinder barrel 148 which is rotatably journaled by spaced bearings 149 within a housing 150. The cylinder barrel has a plurality of axially extending bores therein, not shown, which reciprocably mount a plurality of pistons 151 which thrustably engage an inclined thrust plate 152. A valve plate 153 having a fluid inlet port 154 and a discharge port 155 is adapted to sequentially supply and exhaust pressure fluid to and from expansible chambers formed in the individual cylinder bores intermediate the valve plate and the pistons thereby reciprocating the pistons which coact with the thrust plate to effect rotation of the cylinder barrel. This rotation of the cylinder barrel drives a shaft 156 which slidably but nonrotatably mounts a drive mechanism 157 which is adapted to drive a starter pinion gear 158 mounted thereon through an overrunning clutch 157'. The actuating lever 30 is pivotally mounted at 159 on the housing 150 of starter unit and is adapted to shift the drive mechanism 157 axially on the shaft 156 to carry the pinion gear 158 into driving engagement with an engine-driven ring gear 160.

As best seen in Figures 1, 2, 10 and 11, the control valve 28 is mounted on the housing 150 of the starter device 27 and is operable to control the supply of pressurized fluid to the inlet port 154 of the starter motor when the pinion gear 158 is in driving engagement with the engine ring gear 160. The pressurized fluid thus supplied causes the motor to drive the engine with sufficient rotational speed to effect the starting of the engine and is returned from the outlet by piping 161 to the inlet 162 of a hydraulic fluid reservoir 163. An outlet 164 provided in the reservoir 163 is connected through suitable piping 165 and 166 to the inlets of the engine-driven pump 33 and the hand-operated pump 34, respectively. The pump 33 while driven by the engine in the illustrative form of the engine may be driven by some auxiliary power source such as an electric motor. The two pumps 33 and 34 are connected in parallel, their outlets being interconnected through suitable piping 167 and 168, respectively, and are in turn connected through piping 169 and a manually operable valve 170 to the pressure accumulator 32 and through piping 171 to an inlet port 172 in the control valve mechanism 28. Suitable check valves, indicated at 173, 174 and 175, 176 are preferably associated with inlets and outlets of the pumps 33 and 34, respectively, and prevent reverse flow through these pump units. A suitable pressure unloading valve associated with the engine driven pump 33 is operable when the accumulator pressure reaches a predetermined level to unload this pump by returning the pumped fluid through piping 177 to a second inlet 178 provided in the reservoir.

The control valve mechanism 28 comprises a valve body or casing 179 having two valve bores 180 and 181 extending therethrough in side-by-side spaced parallel relation. The bore 180 is sealed at one end by a plate 182 suitably secured and sealed with respect to the valve body. The opposite end of the bore 180 is sealed by a pipe plug 183. A snap ring 184 is mounted in an inwardly opening groove formed intermediate the ends of the bore 180 and serves as an abutment stop for a spool-type valve member 185 which is reciprocably mounted in the bore 180 intermediate the plate 182 and the ring 184. The valve member 185 is provided with a fluid flow controlling reduced diameter portion or land 186 intermediate its ends and a second reduced diameter portion 187 at its end adjacent the closure plate 182. This second reduced diameter portion serves as an internal spring guide for a spring 188 which is compressively interposed between the plate 182 and a shoulder formed on the valve member by the reduced diameter end portion 187. The spring 188 biases the valve member towards the stop ring 184. It will be noted that the closed ends of the bore 180 coact with the valve member 185 to form two opposed expansible chambers 189 and 190.

As explained in greater detail below, the valve member 185 is reciprocable within the bore 180 in accordance with pressure differential occurring between the chambers 189 and 190 to control the flow of pressurized fluid to the starter motor. In its valve-closed position, the reduced diameter end portion 187 of the valve member 185 abuts the cap plate 182 and the opposite large diameter end thereof is effective to prevent fluid flow between an intermediate valve port 191 and a valve outlet port 192 opening on the valve bore 180. In its full-opened position the valve member abuts the snap ring 184 and the reduced diameter land portion 186 permits fluid flow between the valve ports 191 and 192. The valve outlet port 192 is connected, as shown, to the inlet port 154 of the starter motor valve plate 153.

The valve bore 181 is closed at its end adjacent the chamber 189 by a pressure fitting 193 and is undercut intermediate its ends to provide the valve inlet chamber or port 172 which, as indicated above, is connected to the pressure supply system by the piping 171. The inlet chamber or port 172 is also connected to the expansible chamber 189 by an interconnecting passage 194 provided in the valve casing. A second undercutting of the valve bore 181 longitudinally spaced of the inlet chamber 172 forms an intermediate valve chamber or port 195 which is connected to the valve bore 180 by the interconnecting passage 191. The valve chamber 195 is also connected to the expansible chamber 190 by a relatively small passage 196 extending therebetween in the valve body.

The valve member 29 is reciprocably mounted in the valve bore 181 and is sealed with respect thereto by O-rings 197 mounted in spaced annular grooves opening on the valve bore 181. The end of the valve member 29 opposite the fitting 193 projects from the valve body and has a lost-motion, pin-and-slot pivotal connection indicated at 198 with one end of a starter drive shifting lever 199. The lever 199 is pivotally mounted intermediate its ends at 200 on a flange integral with the plate 182 and has a pivotal pin-and-slot actuating connection at 201 with one arm of the lever 30. A bore 202 extends axially of the valve member 29 from its end adjacent the fitting 193 forming a sleeve portion 203 having, in order from the closed end of the bore 202, a bleed orifice 204 and two belts of circumferentially spaced radial ports 205 and 206 spaced longitudinally thereof. The outer end of the bore 202 is closed by a plug 207 to form an expansible chamber 208 intermediate the end of the valve member 29 and the fitting 193.

The chamber 208 is connected through the fitting 193 and piping 209 to an outlet fitting 210 connected to remote control actuating device 31. The actuating device 31 comprises a cylinder body 211 having a bore 212 therein reciprocably mounting a manually operable plunger or piston 213 to form an expansible chamber 214 therebetween. A return spring 215 compressively interposed in the bore 212 between the fitting 210 and the end of the plunger 213 and serves to maintain the plunger normally in the position shown in Figure 12. When the plunger is in this position, the chamber 214 is liquid-full being in communication through port 216 with a fluid reservoir 217 provided in the cylinder body 211.

Upon manual actuation of the plunger 213 to the left, liquid is entrapped in the chamber 214 as the plunger closes the port 216 and is forced through the piping 209 into the actuating expansible chamber 208 of the control valve mechanism 28 thereby causing the valve member 29 to be actuated to the right. This movement of the valve member 29 in turn acts through the lever 199 to actuate the lever 30 to shift the pinion gear 158 towards engagement with the engine ring gear 160. The bleed orifice 204 and the ports 205 and 206 of the valve member 29 are spaced relative to the actuating geometry of the linkage formed by the levers 30 and 199 so that as the pinion gear engages the engine ring gear, the valve member 29 interconnects the valve inlet chamber with the intermediate chamber 195, thereby permitting flow of the pressurized fluid into the intermediate valve chamber 195, first through the bleed orifice 204, the bore 202, and the ports 206 and then through ports 205 and 206 and the bore 202. As the pressure thus applied to the intermediate chamber 195, and hence to the chamber 190, equalizes the pressure acting on the opposite end of the valve member 185, the spring 188 shifts the valve member 185 into abutment with the stop ring 184. In this position, the reduced diameter land 186 interconnects the ports 191 and 192 thereby supplying sufficient actuating fluid to the starter motor to permit rotation of the engine at a starting speed.

However, when tooth abutment occurs between the pinion 158 and the engine ring gear 160, the actuating fluid applied to the chamber 208 by the remote control actuating device 31 is ineffective to shift the valve member 29 beyond its intermediate bleed position until after proper tooth engagement has been initiated. Full accumulator pressure is applied to the intermediate valve chamber 195 and the chamber 190 when the valve member 29 is in this intermediate bleed position. Consequently, the valve member is shifted by the spring 188 to its opened position. However, since the bleed orifice 204 permits only a limited flow of pressurized fluid to the starter motor, the motor is rotated very slowly until the starter pinion has been brought into meshing alignment with the engine ring gear. When such alignment has been effected, actuating pressure applied to the control valve member 29 simultaneously shifts it to its full-opened position and shifts the pinion into full meshing engagement with the engine ring gear whereupon the starter motor drives the engine at a starting speed.

Upon engine starting, the engine tends to drive the starter device 27 through the pinion gear 158. However, the drag of the motor 27' causes the clutch of the starter drive mechanism to overrun thus unloading and substantially reducing the pressure demand of the starter motor 27'. The consequential pressure drop occurring between the inlet valve chamber 172 and the outlet 155 of the motor results in a pressure unbalance whereby the pressure applied to the chamber 189 is effective to shift the valve member 185 to an intermediate position, wherein the reduced fluid pressure within the chamber 190 and the biasing action of the spring 188 are balanced by the pressure applied to the chamber 189, closing the valve ports 191 and 192 to provide only a limited pressure throttling bleed connection therebetween. Should the engine stop after its initial start, the pressure load demand on the starter motor 27' is again increased and, as the pressure again builds up in the intermediate chamber 195, the valve member 185 is again shifted to its full-opened position thus causing the starter device 27 to again rotate the engine at a starting speed.

After the engine starts and the operator releases the actuating plunger 213, the plunger 213 is returned to its initial position by the return spring 215, a port 218 in the cylinder body bleeding fluid from behind the plunger back into the reservoir 217. This return of the plunger 213 to its initial position tends to withdraw the actuating liquid column from the expansible chamber 208 thus permitting return of the valve member 29 to its initial position. However, to insure return of the pinion and starter drive mechanism and of the valve member 29 to their initial positions the lever assembly 30 is biased to its initial position by a torsion spring 219 suitably mounted with respect to the lever pivot 159.

Shutdown overriding control mechanism

Referring more particularly to Figure 6, the two-way relay 35 of the shutdown overriding control mechanism includes a body member 220 having a cylinder bore 221 extending therethrough. The body member 220 is suitably supported with respect to the casing of the blower 12 by a bracket member 222. The opposite ends of the bore 221 are closed by end cap members 223 and 224. The actuator member 36 comprises a piston 225 which is reciprocably and sealingly mounted with respect to the bore 221. A rod 226 extends longitudinally from the piston 225 and is reciprocably and sealingly mounted intermediate its ends by the lower end cap 224. The distal end of the rod 226 carries a roller 227 which is adapted to thrustably engage the edge of the shutdown overriding control lever 43. It will be noted that the upward and downward travel of the piston 225 is restricted by snap rings 238 and 239 carried by the body member and the rod, respectively.

The piston 225 cooperates with the cylinder bore 221 and the lower end cap 224 to define an expansible chamber 228 therebetween which is connected by the pipe 73, as indicated above, to the pressure side of the engine lubricating system. The upper end cap 223 is of cup-shaped configuration and cooperates with the upper end of the body member 220 to define a valve chamber 229 therebetween. The valve chamber 229 is connected by suitable piping 230 to the piping 209 interconnecting the starter control valve 28 and the remote control device and is thus subjected to any remote control starter energizing signal generated by operation of the plunger 213. A two-way check valve member 231 is mounted in the chamber 229 and defines an expansible chamber 232 with respect to the piston 225. The valve member 231 comprises a hat-shaped plate member 233 which has an annular seal washer 234 bonded to the brim of flange portion thereof. A helical spring 235 mounted in the chamber 229 normally biases the valve member 231 to carry the seal washer 234 into sealing engagement with a shoulder defined by the adjacent end of the body member 220. The central portion of the member 233 is provided with a plurality of ports 236 and carries a flap valve member 237 of flexible material which is adapted to permit relatively unrestricted fluid flow through the ports 236 toward the expansible chamber 232 defined between the valve member 231 and the piston 225 but prevents reverse flow therethrough.

In operation, the starter energizing signal pressure generated by the remote control device 31 is also applied to the shutdown overriding control and passes through the ports 236 as permitted by the flap valve member 237, thereby actuating the piston downwardly until the snap ring 239 abuts the end cap member 224. This downward actuation of the piston acts through the roller 227 and the lever 43 and carries the shutdown valve member 37 to its opened position. Due to the check valve operation of the flap valve 237, the oil thus applied to the expansible chamber 232 is trapped between the piston and the two-way check valve member 231 thereby keeping the butterfly valve open even after the starter has been disengaged and the remote control signal pressure has return to zero. However, as the engine oil pressure applied to the expansible chamber 228 below the piston 225 reaches a predetermined pressure dependent on the biasing rate of the spring 235 and exceeding that required to effect valve latching operation of the pressure responsive device 23, the piston is actuated upwardly unseating the valve member and its seal washer 234 and forcing the previously entrapped oil back to the reservoir 217 of the remote control device 31.

From the foregoing description, it will be seen that the several objectives of the invention are obtained in the preferred illustrative embodiment. It will also be appreciated by those skilled in the art that various changes might be made therein without departing from the spirirt and scope of the invention, as defined in the following claims.

I claim:

1. In combination with an internal combustion engine having a fluid pressure system, an engine protective means operable in response to fluid pressure in said system below a predetermined minimum to shut down operation of said engine, hydraulic engine starting means operable to drive said engine at a speed sufficient to initiate engine operation, a fluid pressure means actuatable to control the energization of said hydraulic starting means to drive said engine, remote control means operable to control actuating fluid to said fluid pressure means, and means responsive to the fluid pressure supplied to said fluid pressure means by said remote control means to render said engine protective means ineffective to shut down the operation of said engine, said last-mentioned means being further responsive to the fluid pressure in said system to condition said engine protective means to render it effective to shut down the engine when the fluid pressure in said system exceeds said predetermined minimum pressure.

2. In an internal combustion engine having an oil pressure lubricating system, protective means operable in response to lubricating pressure below a predetermined minimum pressure to prevent further operation of said engine, an engine starting device adapted to drive said engine at a speed sufficient to initiate engine operation, a remote control means operable to control the energization of said starting device to drive said engine, means operable in response to the operation of said remote control means to render said engine protective means ineffective to prevent further operation of said engine, and said last mentioned means including means responsive to oil pressure in said lubricating system above said predetermined minimum pressure to condition said engine protective means to render it effective to prevent further operation of the engine in response to a drop in oil pressure below said predetermined minimum pressure.

3. In an engine having an engine protective system operable in response to an excessive variation of a certain engine operating characteristic from a predetermined safe operating level to automatically shut down the operation of said engine, an engine starting device adapted to initiate engine operation, control means operable to effect the energization of said starting device to start said engine, means responsive to the operation of said control means to render said engine protective means ineffective to shut down the operation of said engine, and said last mentioned means including means responsive to said engine operating condition and operable upon said condition reaching a safe operating level after engine starting to condition said engine protective system to shut down the operation of the engine should an excessive variation in said operating condition from said safe operating level occur.

4. In an internal combustion engine having a combustion air supply duct, an oil pressure lubricating system, a valve in said air supply duct normally operable to stop the flow of air therethrough but movable to an open position permitting such flow, latch means for holding said valve in its open position, means responsive to the engine oil pressure and operable to actuate said latch means to retain said valve in its open position when the engine oil pressure is above a predetermined minimum and to permit the valve to close when the engine oil pressure is below said predetermined minimum, engine starting means energizable to drive the engine at a speed sufficient to initiate engine operation, a first fluid pressure actuated means operable to control the energization of said starting means, a remote control means operable to supply fluid pressure causing said first fluid pressure actuated means to energize said starting means, a second fluid pressure actuated means operable in response to the pressure signal supplied to said first means to actuate said valve to its opened position, said second means including means for retaining said valve in its opened position and means responsive to the oil pressure in said lubricating system to render said valve retaining means ineffective to further retain the valve in its open position when the engine oil pressure has reached a value above said predetermined minimum pressure.

5. In an internal combustion engine having a combustion air supply duct, a valve in said air supply duct normally operable to prevent the flow of air therethrough but movable to an open position permitting such flow, latch means operable to hold said valve in its open position, means responsive to an engine operating condition to actuate said latch means to retain said valve in its open position when said operating condition is within a safe operating range and to permit the valve to close when said operating condition deviates from said operating range, engine starting means operable to drive the engine at a speed sufficient to initiate engine operation, a remote control means operable to control the energization of said starting means, means responsive to the operation of said remote control means to actuate said valve to its opened position and to retain said valve in its opened position upon actuation of said remote control means to energize said starting means, and a second means responsive to said engine operating condition and operable when the engine operating condition has reached said safe operating range to actuate said valve retaining means to an operational position wherein it is ineffective to further retain the valve in its open position.

6. In an internal combustion engine having a combustion air supply duct, an oil pressure lubricating system, a valve member in said air supply duct normally operable to prevent the flow of air therethrough but movable to an open position permitting such flow, latch means operable to hold said valve in its open position, a first fluid pressure actuated means responsive to the oil pressure in said system and operable to actuate said latch means to retain said valve in its open position when the oil pressure is above a predetermined minimum and to permit the valve to close when the engine oil pressure is below said predetermined minimum, hydraulic engine starting means operable by pressurized hydraulic fluid supplied thereto to drive the engine at a speed sufficient to initiate engine operation, control valve means operable to supply hydraulic fluid to said starting means, a second fluid pressure actuated means operable to actuate said control valve means to supply hydraulic fluid to said starting means, a remote control means operable to supply a fluid pressure signal causing said fluid pressure means to actuate said control valve means to supply hydraulic fluid energizing said starting means, a third fluid pressure actuated means having a fluid connection with and responsive to the pressure signal supplied by said remote control means to actuate said valve member to its opened position, said fluid connection including a two-way check valve means normally operable to trap the supplied remote control pressure signal within said second fluid pressure actuated means to retain said valve in its opened position, and a fourth fluid pressure actuated means responsive to the oil pressure in said lubricating system and operable to render said third means and said check valve means ineffective to further retain the valve in its open position when the engine oil pressure has reached a value above said predetermined minimum pressure.

7. In an engine, a first means responsive to an engine operating condition and operable in response to a deviation in said operating condition from a safe operating level to shut down operation of said engine, a first fluid pressure actuated means operable in response to a fluid pressure signal supplied thereto to initiate engine operation, a control means operable to supply an actuating fluid pressure signal to said first pressure actuated means, a second fluid pressure actuated means having a fluid connection with and operable in response to the fluid pressure signal supplied by said control means to render said engine operating condition responsive means ineffective to shut down the operation of said engine, said fluid connection including a check valve means normally operable to permit relatively unrestricted fluid flow to said second pressure actuated means from said control means and to prevent reverse flow therefrom thereby maintaining said second pressure actuated means operative to retain said first condition responsive means ineffective to shut down the operation of the engine, and a second means responsive to said engine operating condition and operable in response to said condition reaching its safe operating level to condition said check valve means to permit reverse flow from said second pressure actuated means whereby said first condition responsive means is rendered effective to shut down the engine should the operating condition subsequently deviate from its safe operating level.

References Cited in the file of this patent

UNITED STATES PATENTS

| | | |
|---|---|---|
| 2,537,354 | Korte et al. | Jan. 9, 1951 |
| 2,725,867 | Steberl | Dec. 6, 1955 |
| 2,731,001 | Dickson et al. | Jan. 17, 1956 |
| 2,845,916 | Pihiel | Aug. 5, 1958 |
| 2,894,502 | O'Brien et al. | July 14, 1959 |